Feb. 28, 1939. R. L. SMITH 2,148,657
STORAGE BATTERY LEVEL INDICATOR
Original Filed March 30, 1933
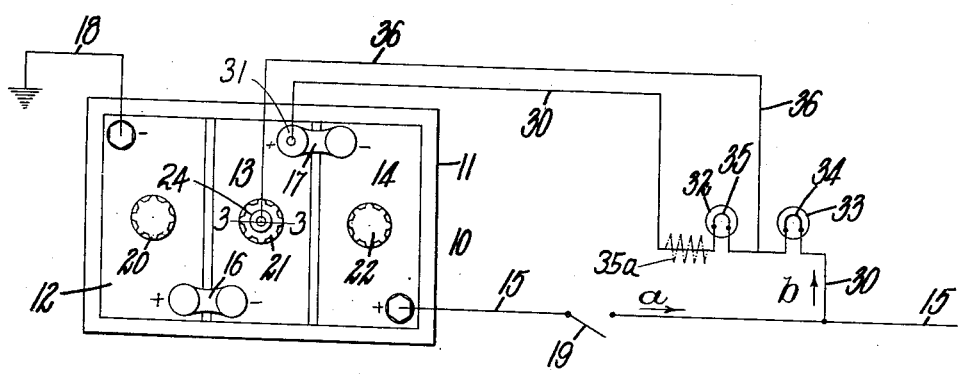
Fig. 1.
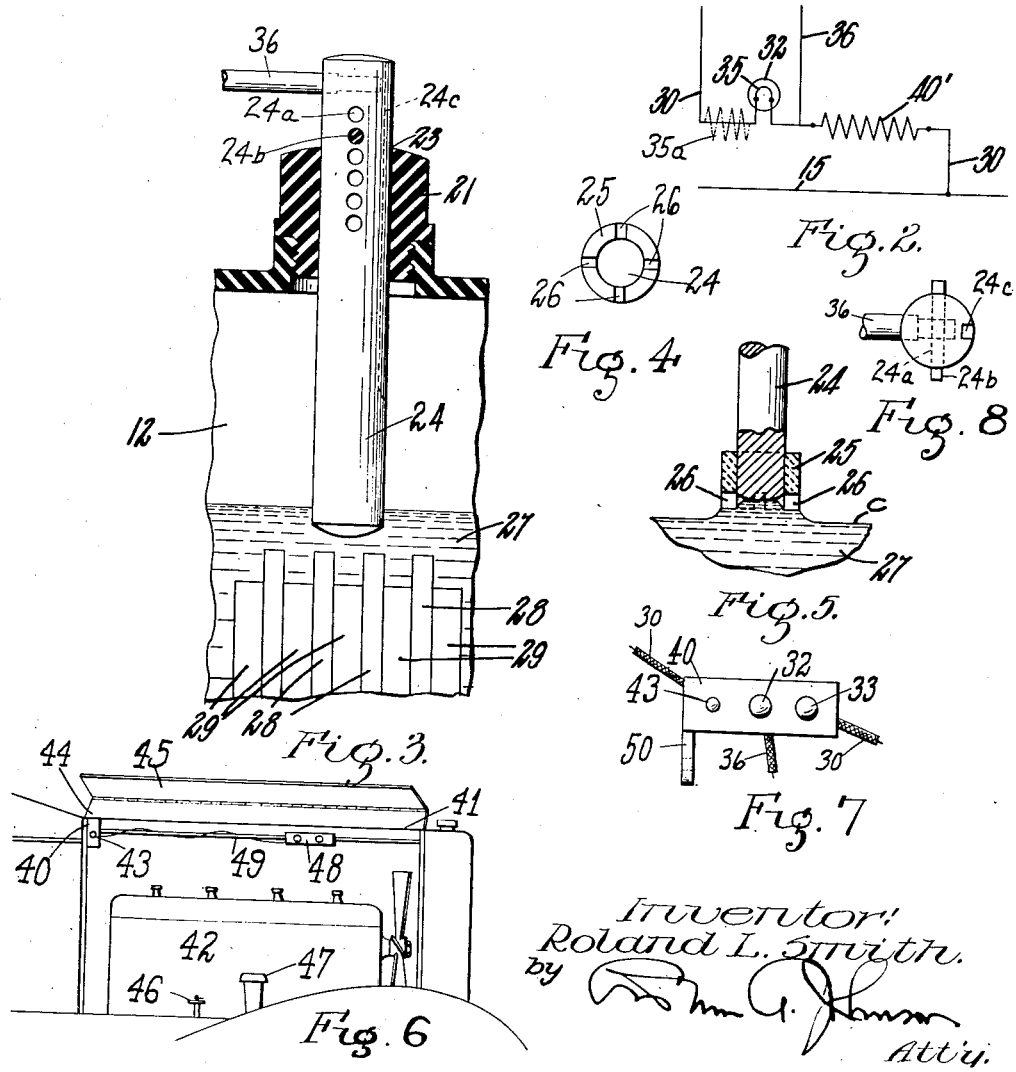
Inventor:
Roland L. Smith
by
Atty.

Patented Feb. 28, 1939

2,148,657

UNITED STATES PATENT OFFICE 2,148,657

STORAGE BATTERY LEVEL INDICATOR

Roland L. Smith, Belmont, Mass.

Application March 30, 1933, Serial No. 663,534
Renewed January 20, 1938

6 Claims. (Cl. 177—311)

This invention relates to a device for indicating the level of the liquid in a storage battery, and is especially adapted to be used with the storage batteries of automobiles, motor boats and the like, to indicate to the operator when the electrolyte in the battery has descended to a level where water should be added to the battery.

Heretofore it was proposed to provide a signal for storage batteries, but with such proposals the signal light remained visible when the battery did not need to be refilled with water. Accordingly, there was a constant drain on the battery when in use and it depended upon the current consumed by the signal light. With this proposal, the operator became accustomed to seeing the signal light when the vehicle was in use and would be apprised of the fact that the battery needed refilling only by the fact that the signal was no longer illuminated. The absence of the signal might be overlooked by the operator. If the light first went out when it was not convenient to refill the battery, the operator might become accustomed to the absence of the signal light and neglect to attend to the battery. Again, if the lamp itself burned out, the operator would be misled into thinking that the battery needed refilling when in fact it did not.

An object of the present invention is to provide a signal which becomes effective to warn the operator that the battery needs refilling. The device of the present invention is, therefore, positive whereas those of the prior art were impositive.

Another object of this invention is to provide a signal which shines but dimly when the battery does not need refilling and glows brilliantly when the battery needs refilling. With this arrangement, should the lamp filament of the signal burn out, the operator would become aware of this condition by merely observing the signal.

In accordance with this invention, instead of having a single signal light which, by a dull glow or a brilliant glow, indicates the condition of the water in the battery, two separate signal lights may be employed—a green one, for instance, to indicate that the battery does not need refilling, and a red signal to indicate that the level of the electrolyte in the battery is such that the battery should be refilled.

Accordingly, it will be noted that in its more specific aspect, the present invention contemplates the provision of a signal system whereby the operator may positively and affirmatively determine the proper functioning of the system as well as whether the battery does or does not need refilling.

The signal device of the present invention may be connected with the ignition or light switch of the conveyance with which the storage battery is used so that when the conveyance is out of use or the motor is stopped, the signal system will be rendered inoperative, and likewise when the motor is started the signal will be made operative. Or, if desired, the signal circuit may be closed by a separate switch and this separate switch may be either manually operated or automatically operated. When the switch is to be automatically operated, it may advantageously be placed so as to become effective when the engine hood is thrown back to give access to the oil inlet pipe of the engine. In this case, the signal device will be placed or located so as to be in the view of the service man who may immediately attend to the refilling of the battery.

With this arrangement, a duplicate signal may be mounted on the instrument board of the vehicle so that if the service man does not respond to the signal or does not understand its meaning, the driver of the conveyance may know the condition and instruct the service man accordingly.

Other features and advantages will hereinafter appear.

In the accompanying drawing—

Figure 1 is a plan view of a storage battery, the electric circuit to the engine and the conducting wires to the lamps being shown therein as connected and used according to one form of this invention.

Fig. 2 is a detail view illustrating a modification of a part of the system shown in Fig. 1 in which modification a resistance member is used and only one lamp employed.

Fig. 3 is an enlarged sectional elevation taken on line 3—3 through one cell of the battery, particularly illustrating the preferred form of auxiliary electrode and its mounting.

Fig. 4 is an underneath plan of the auxiliary electrode of a modified form.

Fig. 5 is a detail sectional elevation illustrating the electrolyte contacting with the lower end of the auxiliary electrode shown in Fig. 4 just prior to the electrolyte being lowered to such a level as to break contact with the lower end of the auxiliary electrode.

Fig. 6 is a schematic view showing the switch provided by the present invention to be operated when the hood of the engine is thrown back.

Fig. 7 shows a modified form of the device shown in Fig. 6, wherein the signal lamps and switch are carried by the same block.

Fig. 8 is a top plan view of the electrode shown in Fig. 3.

In the drawing, 10 indicates a storage battery of usual and well-known construction comprising a casing 11 and cells 12, 13 and 14. A conductor 15 is connected in the usual manner to the positive pole of the cell 14 and passes therefrom through the ignition system of the engine to the ground. The positive pole of the cell 12 is connected to the negative pole of the cell 13 by a bus bar 16, and the positive pole of the cell 13 is connected to the negative pole of the cell 14 by a bus bar 17. A conductor 18 connects the negative pole of the cell 12 to the ground, all in the usual manner.

A switch 19 is provided in the circuit conductor 15.

The cells 12, 13, and 14 are provided with screw plugs 20, 21 and 22 respectively, the screw plugs 20 and 22 being of the usual construction. The screw plug 21 is illustrated in Fig. 3 in detail, being provided with an orifice 23 in which is slidably positioned an auxiliary electrode 24 consisting preferably of a rod of metal, such as lead, and having its lower end somewhat rounded off. Also at its lower end, as shown in Figs. 4 and 5, the electrode 24 may have a sleeve 25 which may be adjusted thereon. The sleeve 25 has slots 26 extending across the bottom thereof and forming passages which conduct the electrolyte 27 in the cell to the bottom of the auxiliary electrode. The sleeve 25 may rest upon separators 28 which in the usual manner separate the electrodes 29 of the cell from each other. It will be seen that by adjusting the sleeve 25 on the auxiliary electrode, said auxiliary electrode may be positioned at any predetermined point above the separators or plates while making electrical contact with the electrolyte in the battery so long as the electrolyte is at or above a predetermined level.

In case the plates 29 of the battery project beyond the separators 28 or if it is not desired to have the collar 25 or electrode 24 contact with the plate, the arrangement shown in Fig. 3 may advantageously be employed. In such case, the electrode is provided with a series of spaced holes 24a adapted to receive a tapered pin 24b preferably of hard rubber or fiber. These holes 24a are so spaced that when the electrode 24 is depressed until its end or the collar 25 engages the plates or separators, the electrode may be raised until the pin 24b may be inserted in the hole 24a which is located just above the top surface of the cap 21. In this condition the end of the electrode and the collar (if used) will be properly spaced from the plates 29 or separators 28 for the pin 24b engaging the cap prevents downward movement of the electrode in the cell.

A conductor 30 leads from the positive pole 31 of the cell 13 to the main conductor 15. In this conductor 30 there are interposed, in one form of this invention, a signal lamp 32 and a signal lamp 33. The filament 34 of the lamp 33 is heavier than the filament 35 of the lamp 32, whereby if the same current passes through each, lamp 32 will glow more brightly than lamp 33.

Another conductor 36 has one end preferably forced into or cast in the upper end of the auxiliary electrode 24. This conductor leads from the auxiliary electrode to the portion of the conductor 30 located intermediate the elements 32 and 33.

Caps, such as the caps 20, for storage batteries are usually provided with a relatively large central cavity at its lower end. This fact is taken advantage of by the present invention by making the electrode to fit the diameter of this cavity, and hence it is merely necessary to continue to bore out the cap to the top surface thereof before inserting the electrode.

This boring would remove the usual vent opening in the cap, and accordingly the electrode 24 of the present invention is provided with a longitudinal groove 24c affording an escape slot for the gases generated in the battery.

The general operation of the device hereinbefore specifically described and illustrated in Figs. 1, 3, 4 and 5 is as follows:—

The electric current from the storage battery flows in the direction of the arrow a along the electric circuit conductor 15 through usual ignition and lamp circuits, etc., to the ground and back through the conductor 18 into the battery in the usual manner. When the auxiliary conductor 24 is projecting into the electrolyte as illustrated in Fig. 3 and the switch 19 is closed, an electric current flows from the main electric circuit conductor 15 in the direction of the arrow b through the conductor 30 and the lamp 33 and thence through the conductor 36 to the auxiliary electrode 24, thence through the electrolyte to the positive pole of the cell 13 of the storage battery.

At the same time a slight amount of the current flows along the conductor 30 through the lamp 32 but only sufficient to make it glow dimly. This current will be small because the total current will divide between the circuits 36 and 30, the greater part passing through 36, this being the path of least resistance to the pole 31 from which the current passes to the negative pole of the cell 14. Under this condition of affairs the lamp 33 (which preferably gives a green light signal) is lighted brightly, the light 32 (which preferably gives a red light signal) glows dimly, and the operator is thus apprised of the fact that there is plenty of electrolyte in the storage battery cell and also that the lamps 32 and 33 are in good condition.

When the electrolyte descends to such a point that it does not contact with the auxiliary electrode, then the circuit through the conductor 36 is broken and the electric current flows from the main circuit conductor 15 in the direction of the arrow b through the lamp 33 causing it to glow dimly, thence to the lamp 32 causing it to glow brightly, and thence along the conductor 30 to the terminal 31 of the storage battery cell 13 or bus bar 17.

This condition of relative brightness exists because, as explained before, with the same current going through both lamps, lamp 33 with the heavy filament will not glow as brightly as lamp 32 with its thinner filament.

As the level of the electrolyte descends and finally breaks contact with the electrode 24, it is very desirable that it should not intermittently contact with the bottom of the electrode, due to splashing, for in such case the green and red lights would intermittently and alternately flicker or flash, and to prevent this a member, consisting preferably of the sleeve 25, as illustrated in Figs. 4 and 5, is attached to the auxiliary electrode 24, and the same being provided with slots or passages 26 extending thereacross.

When the level of the electrolyte has descended to the position relative to the auxiliary electrode, illustrated in Fig. 5, then the main level c of the electrolyte is below the bottom of the auxiliary electrode 24 but it still contacts therewith, as illustrated, clinging to the lower end of the electrode by reason of capillary attraction or surface tension until the level of the electrolyte descends to an appreciable distance below the bottom of the auxiliary electrode, and when finally the contact of the electrolyte with the bottom of the auxiliary electrode is broken, then there is such a distance between the level of the electrolyte and the bottom of the auxiliary electrode that there is little danger of the splashing of the electrolyte upwardly and into contact with the bottom of the electrode.

When the collar 25 is made of insulating material as shown, splashing of the electrolyte c against its lower edges will not affect the signal light circuits.

The bottom of the electrode is preferably rounded to avoid the collection of gases under the same, which gases may cause the electric contact between the electrode and the electrolyte to be of higher resistance than desired.

The lamp 33, in addition to giving a green light to show that there is plenty of electrolyte in the cell forms a resistance member. Accordingly, in another form of this invention a resistance member 40', such as illustrated in Fig. 2 may be substituted for the lamp 33 in the conductor 30, the red lamp 32 being retained and the conductors 30 and 36 performing the same functions in the same manner as hereinbefore described in connection with that embodiment of my invention illustrated in Fig. 1.

If it is desired that the signal light 32 should not visibly glow when the battery does not need refilling, an auxiliary resistance 35a may be placed in series with it as indicated in dot-and-dash lines in Figs. 1 and 2.

The switch 19 may, if desired, be the main ignition or lighting switch controlling the use of the motor car, boat, or other conveyance with which the storage battery is used, and in such cases the signal lamp or lamps may be installed on the instrument board.

Under such conditions, the signal 32 may become operative to indicate that the battery needs refilling while the conveyance is being used, but the light becomes extinguished when the engine is stopped or the conveyance is out of use. It is therefore necessary for the operator to remember, after throwing off the ignition switch, that the battery needs attention, for he will not again receive the signal until the conveyance is again put into use.

Since the servicing of the battery is usually performed at a service station when taking on fuel, oil, or water, and since the ignition key or main switch is usually thrown off at this time, the signal, if arranged as above described, would not be given to the operator at the most advantageous time.

According to the present invention, means are also provided for rendering the signal system operative when the conveyance is being serviced, and for this purpose in Fig. 6 the signal circuit is shown as controlled entirely independently of the ignition or main switch.

As illustrated in Fig. 6, the signal circuit is controlled by a switch 40 preferably mounted under the hood 41 for the engine 42 of the conveyance. This switch may be of the plunger type and has its plunger 43 located in position to be engaged by a portion 44 of the hinged side and top 45 of the hood.

Thus, when the service man lifts the hinged side and top 45 of the hood to obtain access to the oil gage 46 or oil intake pipe 47, the signal circuit is closed and either signal lamp 32 or 33 glows brilliantly depending upon the condition of the electrolyte in the battery.

When the switch for the signal is arranged as shown in Fig. 6, the signal lamps may be mounted on a block 48 and may be conveniently supported on the usual stay rod 49 which is then directly in front of the service man so that he may be advised whether or not the battery needs refilling with water. Or, as illustrated in Fig. 7, the switch 40 with its plunger 43 may be supported on one block with the lamps 32 and 33, and this may be provided with a bracket 50 by means of which it may be attached in proper position under the hood.

Even when the signal circuit is controlled by the switch 40, the signal lamps 32 and 33 may be mounted on the instrument board rather than under the hood, so that the driver of the conveyance can determine for himself the condition of the battery; or, if desired, the arrangement may be as shown in Fig. 6, with duplicate lamps in parallel to the lamps 32 and 33 being located on the instrument board.

It is to be understood that while the device as described utilizes lamps as signal means, I do not limit myself to this construction but reserve the right to substitute such other visible or audible means for performing the functions described as may seem desirable.

Other variations and modifications may be made within the scope of this invention and portions of the improvements may be used without others.

Having this described the invention, what is claimed as new and for which it is desired to obtain Letters-Patent, is:—

1. A liquid level indicator for storage batteries having, in combination, an igniting and lighting circuit; a storage battery in said circuit; a danger signal lamp and a second lamp of lesser resistance, connected in series; an electrical connection between the remaining end of the second lamp and one terminal of the battery; an electrical connection between the remaining end of the danger signal lamp and a terminal of a cell of the battery other than the terminal connected to said second lamp, so that both lamps are continually energized; and means acted upon by the liquid in the cell to which the danger signal lamp is connected and electrically connected to the common connection of the lamps for causing one lamp or the other lamp to glow brightly depending upon whether or not there is sufficient liquid in said cell.

2. A liquid level indicator for storage batteries having, in combination, an igniting and lighting circuit; a storage battery in said circuit; a normal condition test signal; an electrical connection from one terminal of the signal to one terminal of the battery; electrical resistance means of higher resistance than the signal, connecting the other terminal of the signal to a terminal of a cell of the battery other than the terminal connected to the signal; and means acted upon by the liquid in the cell to which the resistance means is connected, and electrically connected to the common connection of the signal and the resistance means, for causing the signal to glow brightly when the battery contains sufficient liquid, and to glow dimly when the liquid in the battery is out of contact with the last-named means.

3. A liquid level indicator for storage batteries having, in combination, a storage battery, an auxiliary electrode positioned in one cell of said battery, a low-resistance lamp, a higher resistance lamp, said lamps being in series, a conductor connected from a point between said lamps to said auxiliary electrode, a second conductor from the higher resistance lamp to a terminal of said one cell of said battery, a third conductor from the low-resistance lamp to an outside pole of an adjacent cell of said battery, and a switch in said third conductor whereby two complete circuits are formed when the electrolyte in said battery is in contact with the auxiliary electrode and one circuit only is formed when said electrolyte is out of contact with the auxiliary electrode, said one circuit having the lamps in series.

4. In a liquid level indicator for storage batteries, the combination of an ignition and lighting circuit; a storage battery having a plurality of cells provided with poles interconnected by bus bars and the end cells each having a terminal connected to the said circuit; an auxiliary electrode positioned in one of said cells and adapted to project into the electrolyte therein; a conductor connecting one of the interconnected poles of said cell containing the auxiliary electrode to said circuit; a signal member interposed in said conductor and a resistance member series connected to the signal member, the member which is connected directly to the interconnected poles of the said cell being of higher resistance than the other member; and another conductor connected at one end to said auxiliary electrode and at the other end to a point between the series connected signal and resistance member.

5. The invention as set forth in claim 4, in which the resistance member is a lamp of lower resistance than the other lamp whereby when the auxiliary electrode is contacting with the electrolyte in said cell one lamp will glow brightly and the other lamp will glow dimly, and when the auxiliary electrode is not in contact with the electrolyte the condition of glow of the lamps will be reversed.

6. The invention as set forth in claim 4, in which there is a switch in said circuit between one terminal of the storage battery and the point in the circuit where said first-named conductor is connected thereto.

ROLAND L. SMITH.